United States Patent [19]

Schliehe et al.

[11] Patent Number: 4,921,414

[45] Date of Patent: May 1, 1990

[54] EXTRUSION APPARATUS FOR PRODUCING MARBELEIZED THERMOPLASTIC EXTRUSIONS

[75] Inventors: Wolf D. Schliehe, Dorsten; Mathias Eschbach, Haltern, both of Fed. Rep. of Germany

[73] Assignee: W. Dollken & Co. GmbH, Essen, Fed. Rep. of Germany

[21] Appl. No.: 167,633

[22] Filed: Mar. 14, 1988

[30] Foreign Application Priority Data

May 27, 1987 [DE] Fed. Rep. of Germany ....... 3717967

[51] Int. Cl.$^5$ .................. B29C 47/04; B29C 47/66
[52] U.S. Cl. ............................... 425/131.1; 264/75; 425/197; 425/205; 425/206; 425/380; 425/382.4
[58] Field of Search .................. 425/131.1, 131, 197, 425/198, 199, 130, 132, 208, 376 A, 376 R, 206, 205, 380, 382.4; 264/75

[56] References Cited

U.S. PATENT DOCUMENTS

| | | | |
|---|---|---|---|
| 2,138,378 | 11/1938 | Johnson | 425/131 |
| 2,233,987 | 3/1941 | Orsini | 425/131.1 |
| 2,923,972 | 2/1960 | De Ghetto | 425/192 |
| 3,676,538 | 7/1972 | Patterson | 425/131.1 |
| 3,737,506 | 6/1973 | Martin et al. | 264/176.1 |
| 3,779,676 | 12/1973 | Bernard | 425/131.1 |
| 3,876,743 | 4/1975 | Soderlund et al. | 264/171 |
| 4,057,379 | 11/1977 | Sato | 425/199 |
| 4,182,603 | 1/1980 | Knittel | 425/462 |
| 4,533,310 | 8/1985 | Spinner | 425/376 R |
| 4,542,686 | 9/1985 | Bensal | 425/131.1 |
| 4,687,430 | 8/1987 | Morris et al. | 425/133.1 |
| 4,728,279 | 3/1988 | Bellmer | 425/197 |

FOREIGN PATENT DOCUMENTS 1586010 3/1981 United Kingdom .

*Primary Examiner*—Jay H. Woo
*Assistant Examiner*—K. P. Nguyen
*Attorney, Agent, or Firm*—Herbert Dubno

[57] ABSTRACT

The extrusion apparatus used to make a marbled section of a thermoplastic material is connectable to a screw press with at least one screw shaft and an extruder housing. A thermoplastic base material having one color is fed in using the screw press. A thermoplastic marbling material having another color is mixed with the thermoplastic base material. The extrusion apparatus includes an extrusion apparatus housing, a central passage for receiving the thermoplastic base material which encloses the screw shaft and a shaping outlet. The extrusion apparatus housing has at least one injector cavity in which an injection device for feeding in the thermoplastic marbling material is mounted. This injection device for feeding the thermoplastic marbling material projects fingerlike approximately transverse to the extrusion direction of the thermoplastic base material and has a plurality of injector ducts which open in the central passage at a variety of locations across the cross section of the central passage and a wall of the central passage is provided with a rifled section or insert.

3 Claims, 2 Drawing Sheets

EXTRUSION APPARATUS FOR PRODUCING MARBELEIZED THERMOPLASTIC EXTRUSIONS

FIELD OF THE INVENTION

Our present invention relates to an extruder or extrusion apparatus and, more particularly, to an extruder die or head which produces a marbleized thermoplastic extruded product, especially bars, rods or strands having a profile imparted by a die.

BACKGROUND OF THE INVENTION

An extrusion apparatus or head used to make a marbled profile of a thermoplastic material is connectable to a screw press or extruder with at least one screw shaft and with an extruder housing. A thermoplastic marbling material having one color is mixed with a thermoplastic base material of another different color to produce a marbled thermoplastic product.

This extrusion apparatus or head comprises an extrusion apparatus housing, a central passage for receiving the thermoplastic base material which connects to the screw shaft and a shaping outlet. The extrusion apparatus housing has at least one injector cavity in which is mounted an injection device for feeding in the thermoplastic marbling material. It is understood that the thermoplastic marbling material is specially prepared and fed to the injection device for feeding it in. Generally this preparation occurs in a separate extruder.

In the known extrusion apparatus see (British Patent Specification 1,586,010) the injection device for feeding in the thermoplastic marbling material opens onto the wall of the central passage of the extrusion apparatus, i.e. onto the surface of the extrudate made of the thermoplastic base material which is impressed from the screw press into the central passage. The central passage is smooth. The thermoplastic base material which is impressed into this central passage carries with it a twist configuration derived from the screw press. According to the viscosity of the thermoplastic material with which one works the marbling of the product may not completely satisfy requirements. Especially the marbling may not be impressed completely "through and through" the cross section of the extruded profile.

OBJECTS OF THE INVENTION

It is an object of our invention to provide an improved extrusion apparatus which produces a product which is marbled and which avoids the abovementioned difficulties and disadvantages.

It is also an object of our invention to provide an improved extrusion apparatus which produces a product which is marbled which satisfies all requirements regardless of the viscosity of the thermoplastic base material.

It is another object of our invention to provide an improved extrusion apparatus which produces a product which is marbled which satisfies all requirements and with which especially marbling is impressed "through and through" the entire product cross section.

SUMMARY OF THE INVENTION

These objects and others which will become more readily apparent hereinafter are attained in accordance with our invention in an extrusion apparatus used to make a marbled section (structural shape or profile) made from a thermoplastic material which is connectable to a screw press with at least one screw shaft and a screw press housing.

A thermoplastic marbling material having one color is mixed with a thermoplastic base material of another color to produced a marbled thermoplastic product. This extrusion apparatus comprises an extrusion apparatus housing, a central passage for receiving the thermoplastic base material which connects to the screw shaft and a shaping outlet. The extrusion apparatus housing has at least one injector cavity in which an injection device for feeding in the thermoplastic marbling material is mounted.

According to our invention the injection device for feeding the thermoplastic marbling material projects fingerlike approximately transverse to the extrusion direction of the base thermoplastic material and has a plurality of injector ducts which open in the central passage in a variety of locations over the cross section of the central passage and a wall of the central passage is provided with a rifled (helically ribbed) section or insert.

The central passage can have a cylindrical shape over at least a portion of the way up to the rifled section or insert. Furthermore the central passage can have a cross section transverse to the extrusion direction which is tapered or constricted toward the shaping outlet.

In another embodiment of our invention the central passage has a cross section transverse to the extrusion direction which is tapered or constricted toward the shaping outlet and a perforated disk with a plurality of plate passages distributed cross sectionally (i.e. distributed perpendicular to the extrusion direction) is provided upstream of the shaping outlet in connection with the rifled section or insert. The plate passages of the perforated disk can be inclined according to the amount of tapering or constriction of the cross section of the central passage.

The advantages attained above particularly include the following: in operation of the extrusion apparatus according to our invention a marbled section or product arises whose marbling satisfies all requirements and particularly is impressed completely "through and through" the product's cross section.

BRIEF DESCRIPTION OF THE DRAWING

The above and other objects, features and advantages of our invention will become more readily apparent from the following description, reference being made to the accompanying highly diagrammatic drawing in which.

SPECIFIC DESCRIPTION

Figure 1:
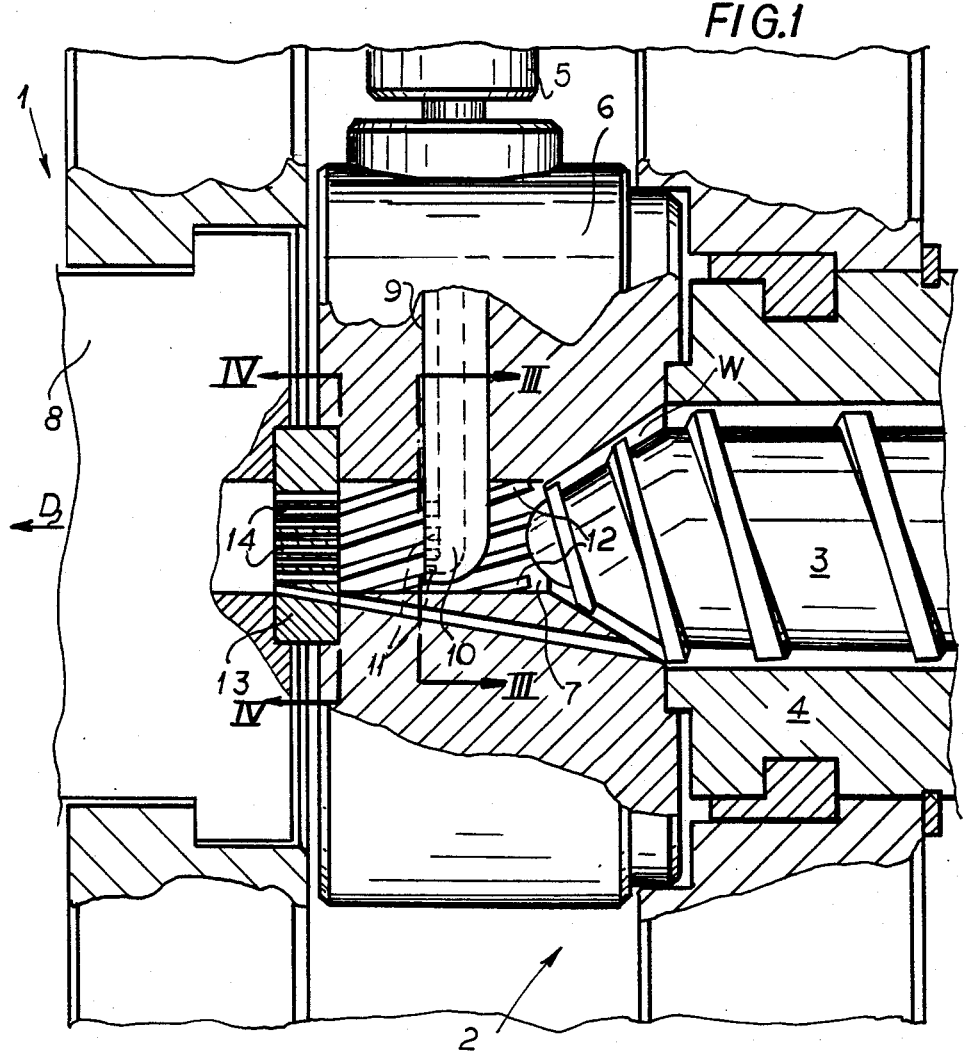
FIG. 1 is an axial cross sectional view of an extrusion apparatus according to our invention.
Figure 3:
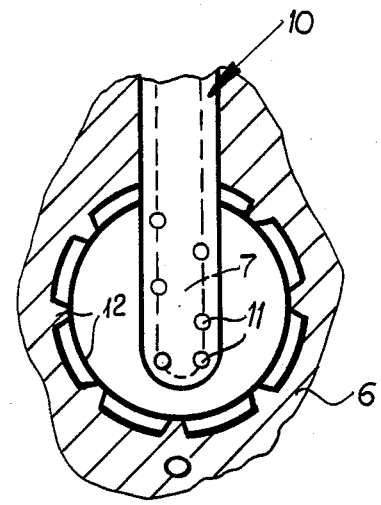
FIG. 3 is a section along the line III—III of FIG. 1.
Figure 4:
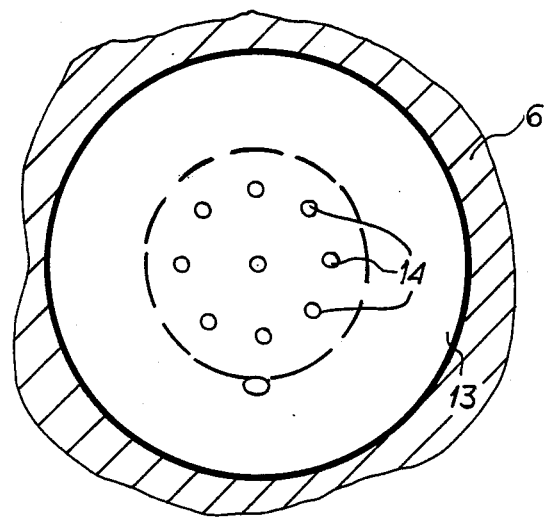
FIG. 4 is a cross sectional view taken along the line IV—IV of FIG. 1.

The extrusion apparatus 1 shown in FIGS. 1, 3 and 4 of the drawing can extrude a marbled section made (structured shape or profile such as a rod or bar) of a thermoplastic material. The extrusion apparatus 1 is connectable to a screw press 2 with a screw shaft 3 and a screw press housing 4.

On the right in FIG. 1 the previously described components of this screw press 2 are shown in cross section. The base material is plasticized thermally and mechanically in the screw press 2. Then a thermoplastic marbling material of another color mix than the thermoplastic base material is fed in. The mixing is effected in a special way as described below. The thermoplastic marbling material may be prepared in the upper extruders 5 indicated in FIG. 1.

The extrusion apparatus 1 basically comprises an extrusion apparatus housing 6, a central passage 7 for receiving the thermoplastic base material which encloses the screw shaft 3 and a shaping outlet 8 which has not been completely illustrated.

The extrusion apparatus housing 6 has an injector cavity 9 in which is mounted an injection device 10 for feeding in the thermoplastic marbling material. The injection device 10 (FIGS. 1, 3 and 4) for feeding in the thermoplastic marbling material projects into the central passage 7 fingerlike approximately transverse to the extrusion direction D of the thermoplastic base material and has a plurality of injector ducts 11.

These open into the central passage 7 in a variety of locations over the cross section of the central passage 7. The wall W of the central passage 7 is provided with a rifled section or insert 12. One can provide also other structures on which the rifling or the helical ribbing is formed.

In this embodiment of our invention which is particularly advantageous as seen in the extrusion direction D from the rifled section 12, a perforated plate 13 with a plurality of plate passages 14 distributed over its cross section is positioned upstream of the shaping outlet 8.

In FIG. 1, the central passage 7 has a cylindrical form at least over a portion of the way up to the rifled section or insert 12.

Figure 2:
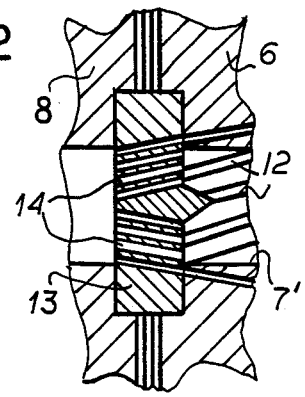
FIG. 2 is a portion of a longitudinal cross sectional view through a portion of another embodiment of an extrusion apparatus according to our invention.

In the embodiment which is shown partially in FIG. 2 the device is designed so that the central passage 7 has a tapering constriction which narrows in the direction of the shaping outlet 8. In this embodiment the plate passages 14 of the perforated plate 13 are inclined according to the amount of tapering of the cross section of the central passage 7.

We claim:

1. An extrusion apparatus for making a marbled extrusion from a thermoplastic base material having one color mixed with a thermoplastic marbling material having another color, said apparatus comprising:
   a screw press having at least one screw;
   a housing having a central passage for receiving said thermoplastic base material, said central passage having a first end and a second end remote from said first end, said first end enclosing at least part of said screw, and said housing having an injector cavity;
   means in said housing defining a shaping outlet communicating with said second end;
   at least one injection finger for feeding said thermoplastic marbling material into said base material mounted in said injector cavity and extending approximately transverse to an extrusion direction of said thermoplastic base material through said passage from said first end to said second end, and said injection finger having therewithin a plurality of injector ducts which open in said central passage so as to distribute said thermoplastic marbling material through said thermoplastic base material;
   a plurality of generally helical ribs generally oriented in a direction of flow of said thermoplastic base material positioned all around on an inner wall defining said central passage to form a rifled section in said central passage directly into which said injection finger extends; and
   a perforated plate positioned between said second end and said outlet, said plate having a plurality of perforations which provide communication between said central chamber and said shaping outlet.

2. The apparatus defined in claim 1 wherein said central passage is tapered towards said shaping outlet.

3. The apparatus defined in claim 1 wherein said perforated plate has perforations which are inclined toward said shaping outlet.

* * * * *